United States Patent [19]

Madsac et al.

[11] Patent Number: 4,702,779
[45] Date of Patent: Oct. 27, 1987

[54] HEAT PROCESS FOR PRODUCING CORROSION RESISTANT STEEL ARTICLES

[75] Inventors: Michel Madsac, Sceaux; René Mauvoisin, Paris, both of France

[73] Assignee: L'Air Liquide, Paris, France

[21] Appl. No.: 916,186

[22] Filed: Oct. 7, 1986

[30] Foreign Application Priority Data

Oct. 8, 1985 [FR] France .................... 85 14849

[51] Int. Cl.$^4$ ............................ C23C 8/24
[52] U.S. Cl. ................... 148/16.6; 148/6.35; 148/16.5
[58] Field of Search ............ 148/16.6, 16.5, 6.35

[56] References Cited

U.S. PATENT DOCUMENTS

4,563,223  1/1986  Dawes ........................ 148/16.6
4,596,611  6/1986  Dawes ........................ 148/16.6

FOREIGN PATENT DOCUMENTS

0077627  4/1983  European Pat. Off. .
0023835  3/1978  Japan ........................ 148/16.6
0624938  8/1978  U.S.S.R. ..................... 148/16.6

*Primary Examiner*—Sam Silverberg
*Attorney, Agent, or Firm*—Lee C. Robinson, Jr.

[57] ABSTRACT

A heat process for producing corrosion resistant steel articles, comprising a first step during which the articles placed in a furnace are nitrided in a gaseous atmosphere to produce on their surface a first layer consisting essentially of epsilon type iron nitride, followed by a second stage during which the articles are exposed to an oxidizing atmosphere to form a second, oxide-rich layer on the surface of the articles. According to the invention, during the first step, an atmosphere comprising 20 to 70% by volume of ammonia $NH_3$, 1 to 5% by volume of nitrous oxide $N_2O$ and 25 to 79% by volume of nitrogen $N_2$ is introduced into the furnace, the concentration ratio of ammonia to nitrous oxide $[NH_3]/[N_2O]$ in the introduced atmosphere being greater than 5 so that the furnace atmosphere is not oxidizing, and during the second step, an atmosphere comprising 0 to 25% by volume $NH_3$, 0 to 5% by volume $N_2O$ and 70 to 100% by volume $N_2$ is introduced into the furnace, the concentration ratio of ammonia to nitrous oxide in the atmosphere introduced in the second step being such that $0 \leq [NH_3]/[N_2O] \leq 5$, the furnace atmosphere being renewed at a rate of 2 to 5 such that the atmosphere gradually becomes oxidizing. The steel articles thus produced feature a base layer of epsilon type iron nitride over the core, an intermediate layer of iron oxinitride having a thickness of 2 to 12 microns and an outermost surface layer of iron oxide having a thickness of 1 to 7 microns.

10 Claims, No Drawings

HEAT PROCESS FOR PRODUCING CORROSION RESISTANT STEEL ARTICLES

BACKGROUND OF THE INVENTION

The present invention relates to a heat process for producing corrosion resistant steel articles, comprising a first step during which the articles are nitrided in a gaseous atmosphere to form on their surface a base layer consisting essentially of epsilon type iron nitride and a second step during which the articles are exposed to an oxidizing atmosphere to form an oxide-rich outermost layer over the base layer of the articles.

Nitriding and nitrocarburizing are processes designed to improve resistance to fatigue, wear, binding and friction. To date, ionic nitriding, certain salt bath processes and certain gaseous processes have proved satisfactory methods of producing nitrided layers having good tribological properties.

Recent attempts at improvements have focussed for the most part on the corrosion resistance of nitrided and nitrocarburized articles. Many such articles, including cooking moulds, glass-making moulds and mechanical parts, are used at temperatures above the ambient temperatures; others are used in fairly corrosive fluid environments (e.g., valves and fittings).

European Pat. Nos. 77,627 and 122,762 describe processes which consist in nitriding or nitrocarburizing steel articles, followed by oxidation in a gaseous atmosphere to provide the articles with a protective oxidized coating.

Oxidation is a discontinuous step which takes place after the nitriding step and requires a concentration of residual air and/or water vapour sufficient to oxidize the articles emerging from the furnace at a temperature of the order of 570° C. This step normally lasts between 5 and 120 seconds. It should be noted that this process does not allow for an oxidation which can be properly controlled or reproduced. U.S. Pat. No. 4,131,492 describes a process whereby nitriding is followed by air oxidation to form an oxidized surface layer on the steel articles, the oxidized layer being such that it is more easily abraded than the nitrided layer, a property which allows for the production of mechanical joints and gears the components of which engage rapidly with little friction. This process does, however, have a drawback in that the oxidized layer has lower surface resistance to abrasion than the nitrided layer. This weak surface resistance to abrasion stems from poor adhesion of the oxidized layer to the nitrided layer.

French Pat. No. 2,560,892 describes a process for ionic nitriding of steel articles. The process consists in providing a gaseous plasma at very low pressure of only a few torr and then forming a nitrided layer on the article, followed by an oxidized surface layer.

This is a very particular method of nitriding. Owing to its characteristics, e.g., low pressure and placement of articles on a cathode, this process does not readily lend itself to industrial application and does not normally make use of ammonia as the nitriding atmosphere. Indeed, the plasma which is generated triggers dissociation of the nitrogen molecules into atomic nitrogen which procides the nitriding atmosphere. This process calls simply for introducing nitrogen into the process chamber to produce nitriding, as opposed to gaseous nitriding wherein ammonia is required to produce active nitrogen. The same phenomenon applies for the oxygen required for oxidation. Furthermore, the method described in this patent entails slow reaction kinetics, a characteristic which does not favour its practical application.

U.S. Pat. No. 2,343,418 describes a process whereby non-reflective aircraft wings are produced by first nitriding such parts to render them resistant to abrasion and then oxidizing them by introducing air into the treatment furnace.

SUMMARY OF THE INVENTION

It is an object of the present invention to provide, by means of gaseous nitriding at a pressure substantially equal to atmospheric pressure, an oxidized layer on the surface of nitrided steel articles, the oxidized layer featuring excellent adhesion to steel articles and thus making them more resistant to abrasion and corrosion.

The process according to the invention is characterized in that during the first step an atmosphere consisting essentially of 20 to 70% by volume of ammonia $NH_3$, 1 to 5% by volume nitrous oxide $N_2O$ and 25 to 79% by volume of nitrogen $N_2$ is introduced into the furnace, the concentration ratio of ammonia to nitrous oxide $[NH_3]/[N_2O]$ in the introduced atmosphere being greater than 5 so that the furnace atmosphere is not oxidizing, and in that during the second step an atmosphere comprising 0 to 25% by volume of $NH_3$, 0 to 5% by volume $N_2O$ and 70 to 100% by volume $N_2$ is introduced into the furnace, the concentration ratio of ammonia to nitrous oxide in the atmosphere introduced during the second step being such that $0 \leq [NH_3]/[N_2O] \leq 5$, the furnace atmosphere being renewed at a rate between 2 and 5 such that the atmosphere gradually becomes oxidizing. In this manner, treated steel articles are obtained which comprise a core covered with a base layer of epsilon type iron nitride, and intermediate layer of iron oxinitride having a thickness of 2 to 12 microns and an outermost surface layer of iron oxide having a thickness of 1 to 7 microns.

The process according to the invention thus entails successive nitriding, oxinitriding and oxidizing. The oxinitriding step which is responsible for formation of the iron oxinitride layer (hereinafter referred to as the "grey layer" given its grey colour, as opposed to the black iron oxide layer and the white epsilon type iron nitride layer) results from gradual transformation of a non-oxidizing atmosphere into an oxidizing atmosphere. The transformation must be slow enough (or the furnace atmosphere renewal rate low enough) to allow this step to produce the desired effect, i.e., the formation of a grey layer having a thickness of about 2 to 12 microns. One skilled in the art shall therefore determine the renewal rate for each type of atmosphere, particularly as a function of other well-known parameters for such a type of process (e.g., temperature). A furnace atmosphere renewal rate n means that the atmosphere is renewed n times per hour.

As the layers of nitrides, generally 5 to 25 microns thick, and oxides are formed by gradual transformation of a nitriding atmosphere into an oxidizing atmosphere, such layers are characterized by continuous structural evolution of nitride, oxinitride and oxide from the nitrogen diffusion layer to the surface of the articles. Thus, the oxidized layer features not only excellent adhesion but also substantial consistency and surface hardness due to the presence of oxinitride, or the grey layer. This results in greatly improved resistance to wear and corrosion.

U.S. Pat. No. 4,531,984 in the name of Applicant describes a process wherein nitrous oxide, owing to its catalytic decomposition on metal articles, serves as an efficient catalyst for the decomposition of ammonia into nitrogen and hydrogen. However, in the second step of the process according to the invention, nitrous oxide, contrary to other known oxidants, has been observed to play a dual role:

(1) The oxygen released through the catalytic decomposition $[N_2O \rightarrow N_2 + O]$ no longer reacts with ammonia to trigger nitriding but with hydrogen, formed by thermal cracking of $NH_3$, to form water vapour. Thus, owing to reduction in the $NH_3$ content, the hydrogen content is sufficiently low for the $PH_2O/PH_2$ ratio to render the atmosphere oxidizing.

(2) The decomposition of nitrous oxide automatically triggers oxidation of the articles, given the low hydrogen content of the atmosphere.

It has thus been observed that compared to the other known oxidants and all other things being equal, nitrous oxide shortens the treatment period for articles having nitrided, oxinitrided and oxidized layers of equivalent thickness. For example, the use of nitrous oxide shortens the treatment period by at least 30% compared to the time required for the same treatment using carbon dioxide.

The ammonia content of the atmosphere introduced during the second step is preferably lower than or the same as in the first step, whereas the nitrous oxide content of the atmosphere in the second step is preferably higher than or the same as in the first step.

Preferably, the variation in the nitrous oxide and/or ammonia concentration will be offset by a corresponding variation in the nitrogen content of the atmosphere.

The first step has the known characteristics of the nitriding and nitrocarburizing processes, with adequate amounts of nitrous oxide (cf. U.S. Pat. No. 4,531,984).

There are two preferred embodiments for the second step:

the second step is carried out over a period of approximately 15 to 60 minutes at a temperature substantially equal to that in the first step;

the second step is carried out at decreasing temperature, starting from the temperature in the first step to a temperature between 300° C. and 450° C.

As a rule, the second step begins immediately upon completion of the first step. It is possible, however, to form the nitrided layer in one furnace and then form the oxinitrided and oxidized layers several days later in another furnace.

According to another preferred embodiment of the invention, the introduction of ammonia into the furnace is totally suppressed at the start of the second step, it being preferable to stop the introduction of oxidizing gas as well. In this case, the desired articles are produced simply by gradual renewal of the furnace atmosphere.

The process according to the invention is applicable in the same manner to fast nitriding (560°–590° C.) and slow nitriding (490°–550° C.).

The following non-limiting examples illustrate the invention.

EXAMPLE 1

An article made of 35 CD 4 steel is nitrided at 530° C. in a mixture of 30% $NH_3$, 3% $N_2O$ and 67% $N_2$.

At the end of the nitriding step (15 hours at 530° C.), the introduction of ammonia is stopped the moment the temperature commences dropping. When the temperature reaches 480° C., a 20-minute step takes place, the atmosphere introduced into the furnace consisting solely of nitrogen and nitrous oxide. Upon completion of this step, the introduction of $N_2O$ is stopped and cooling carries on under an atmosphere of nitrogen only (renewal rate=3).

The result obtained is as follows: the treated steel features a nitrogen diffusion layer the thickness of which varies with the duration of nitriding at 530° C. This layer supports a nitrided layer (white layer) 16 microns thick, which in turn supports an oxinitrided layer some 4 microns thick, covered with a highly adhesive layer of oxide $Fe_3O_4$ having a uniform thickness of 6 microns over the entire surface of the treated article.

EXAMPLE 2

An article made of 30 CDV 12 steel is nitrided at 490° C. in a mixture of 35% $NH_3$, 3% $N_2O$ and 62% $N_2$. At the end of the nitriding step, the introduction of ammonia and $N_2O$ is suppressed the moment cooling begins. At this point, the furnace atmosphere contains enough water vapour, formed earlier by the reaction between the oxygen dissociated from $N_2O$ and the hydrogen from $NH_3$, to oxidize the steel surface during cooling from 490° C. to 350° C. The result is an oxinitrided layer some 4 microns thick and a layer of oxide $Fe_3O_4$ some 3 microns thick (atmosphere renewal rate=3 during the second step.)

EXAMPLE 3

An article made of 35 CD 4 steel is nitrided at 530° C. by introducing into the furnace a mixture of 30% $NH_3$, 3% $N_2O$ and 67% $N_2$. At the end of the 3-hour nitriding step, a mixture of 5% $NH_3$, 3% $N_2O$ and 92% $N_2$ is introduced into the furnace. A 30-min step takes place at the temperature of 530° C. The resulting articles have a nitrided layer of 15µ, a 10 micron oxinitrided layer and a 6 micron oxidized layer (renewal rate=3).

We claim:

1. A heat process for producing corrosion resistant steel articles, comprising a first step during which the articles placed in a furnace are nitrided in a gaseous atmosphere to produce on their surface a first layer consisting essentially of epsilon type iron nitride, followed by a second step during which the articles are exposed to an oxidizing atmosphere to form a second, oxide-rich layer on the surface of said articles, characterized in that during the first step, an atmosphere comprising 20 to 70% by volume of ammonia $NH_3$, 1 to 5% by volume of nitrous oxide $N_2O$ and 25 to 79% by volume of nitrogen $N_2$ is introduced into the furnace, the concentration ratio of ammonia to nitrous oxide $[NH_3]/[N_2O]$ in the introduced atmosphere being greater than 5 so that the furnace atmosphere is not oxidizing, and in that during the second step an atmosphere comprising up to 25% by volume $NH_3$, up to 5% by volume $N_2O$ and 70 to 100% by volume $N_2$ is introduced into the furnace, the concentration ratio of ammonia to nitrous oxide in the atmosphere introduced in the second step being such that $0<[NH_3]/[N_2O]<5$, the furnace atmosphere being renewed at a rate of 2 to 5 such that the atmosphere gradually becomes oxidizing, whereby steel articles are produced which comprise a core covered with a base layer of epsilon type iron nitride, and intermediate layer of iron oxinitride having a thickness of 2 to 12 microns and an outermost surface layer of iron oxide having a thickness of 1 to 7 microns.

2. Process according to claim 1, characterized in that the ammonia content of the atmosphere introduced in the second step is lower than or equal to the ammonia content of the atmosphere introduced in the first step.

3. Process according to claim 1, characterized in that the nitrous oxide content of the atmosphere introduced in the second step is higher than or equal to the nitrous oxide content of the atmosphere introduced in the first step.

4. Process according to claim 1, characterized in that the variation in the nitrous oxide and/or ammonia content is offset by a corresponding variation in the atmospheric nitrogen content.

5. Process according to claim 1, characterized in that the second step is carried out over a period of time of approximately 15 to 60 minutes at a temperature substantially equal to that in the first step.

6. Process according to claim 1, characterized in that the second step is carried out at a decreasing temperature, starting from the temperature in the first step to a temperature between 200° C. and 450° C.

7. Process according to claim 1, characterized in that the second step commences the moment the first step ends.

8. Process according to claim 1, characterized in that the introduction of ammonia into the furnace is totally suppressed at the start of the second step.

9. Process according to claim 8, characterized in that the introduction of nitrous oxide into the furnace is totally suppressed at the start of the second step.

10. Process according to claim 1, characterized in that the furnace atmosphere in the first step also contains elements required for nitrocarburizing said articles.

* * * * *